United States Patent
Xu

(10) Patent No.: US 10,902,549 B2
(45) Date of Patent: Jan. 26, 2021

(54) GRAPHICS PROCESSING SYSTEM

(71) Applicants: INVENTEC (PUDONG) TECHNOLOGY CORPORATION, Shanghai (CN); INVENTEC CORPORATION, Taipei (TW)

(72) Inventor: Ji-Wei Xu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 36 days.

(21) Appl. No.: 16/214,744

(22) Filed: Dec. 10, 2018

(65) Prior Publication Data

US 2020/0143506 A1     May 7, 2020

(30) Foreign Application Priority Data

Nov. 5, 2018 (CN) .......................... 2018 1 1308092

(51) Int. Cl.
    *G06T 1/20*     (2006.01)
    *G06F 13/42*     (2006.01)
    *G06T 15/00*     (2011.01)

(52) U.S. Cl.
    CPC ............ *G06T 1/20* (2013.01); *G06F 13/4221* (2013.01); *G06T 15/005* (2013.01); *G06F 2213/0026* (2013.01)

(58) Field of Classification Search
    CPC ..... G06T 1/20; G06T 15/005; G06F 13/4221; G06F 2213/0026
    See application file for complete search history.

(56) References Cited

U.S. PATENT DOCUMENTS 8,995,302 B1 *   3/2015   Brown .................... H04L 49/00
                                                                                                   370/254
2007/0291535 A1 * 12/2007   Eberle .................. H04L 49/109
                                                                                                   365/174

(Continued)

FOREIGN PATENT DOCUMENTS

| CN | 206039604 U | 3/2017 |
| CN | 107450987 A | 12/2017 |
| TW | 201314703 A | 4/2013 |

OTHER PUBLICATIONS

Office Action in TW Application No. 107143644 dated Nov. 19, 2019.

*Primary Examiner* — Tim T Vo
*Assistant Examiner* — Harry Z Wang
(74) *Attorney, Agent, or Firm* — Maschoff Brennan

(57) ABSTRACT

The present invention provides a graphics processing system, the graphics processing system comprises a central processing unit, a plurality of graphics processing units, a bus communication protocol switch and a management board. The graphics processor units are communicatively coupled to the central processing unit. The bus communication protocol switch is coupled to the graphics processing units to implement mutual communications between the graphics processor units. The management board is coupled to the bus communication protocol switch for managing the bus communication protocol switch. The bus bar communication protocol switch can maximize and equalize the peer-to-peer network communication bandwidth between the graphics processing units, and the theoretical maximum bidirectional bandwidth can reach 300 GB/s, and is capable of expanding additional eight-graphics processing units to form a sixteen-GPUs system that enables peer-to-peer network communication of any two graphics processing units.

8 Claims, 9 Drawing Sheets

(56) References Cited

U.S. PATENT DOCUMENTS

| | | |
|---|---|---|
| 2012/0173755 A1 | 7/2012 | Margulis |
| 2012/0320691 A1 | 12/2012 | Dally et al. |
| 2014/0006679 A1* | 1/2014 | Eguchi .................... G06F 13/36 710/316 |
| 2016/0171575 A1 | 6/2016 | Bowles et al. |
| 2018/0052745 A1* | 2/2018 | Marripudi ........... G06F 11/2046 |
| 2018/0322081 A1* | 11/2018 | Breakstone ............. G06F 13/28 |
| 2020/0065283 A1* | 2/2020 | Jayaraman .......... G06F 13/4027 |

* cited by examiner

GRAPHICS PROCESSING SYSTEM

CROSS-REFERENCE TO RELATED APPLICATIONS

This non-provisional application claims priority under 35 U.S.C. § 119(a) on Patent Application No(s). 201811308092.4 filed in China on Nov. 5, 2018, the entire contents of which are hereby incorporated by reference.

BACKGROUND

1. Technical Field

This disclosure relates to a data processing technology and a data processing system, especially for a graphics processing system.

2. Related Art

As the virtual reality and the artificial intelligence are developed fast, the demand of the system with capable of computing and dealing with massive data is increasing. The graphics processing unit (GPU) is known for its efficient computing performance, so the graphics processing unit is popular in these years.

The GPU is also called the display core, the visual processor, or the display chip, wherein the GPU is a microprocessor performing the image computing in the personal computer, the workstation, the game machine and some mobile devices (such as the tablets or the smart phones, etc.). The GPU is adapted for transforming and driving the display data which the computer system needs, and the GPU supplies the scan signal to the display device for controlling the correct display. Hence, the GPU is an important element for connecting the display device and the mainboard of the personal computer, and the GPU is also one of the important devices of the "human-machine communication".

In practice, it's a common method for enhancing the capability of the graphics processing by using the multi-GPU system. However, since there's the limitation to the communication interface between the GPU and the CPU (central processing unit), and the limitation to the communication bandwidth between the GPU and the CPU, the capability of image processing of the multi-GPU system is also limited. In other words, the capability of the image processing of the multi-GPU system is not able to be exponentially enhanced as the number of the GPU is increased.

SUMMARY

According to one or more embodiment of this disclosure, a graphics processing system is provided, and the graphics processing system comprises a central processing unit, a plurality of graphics processing units, a bus communication protocol switch and a management board. The graphics processing units are communicatively coupled to the central processing unit. The bus communication protocol switch is coupled to the graphics processing units and implements mutual communications between the graphics processing units. The management board is communicatively coupled to the bus communication protocol switch and manages the bus communication protocol switch.

According to one or more embodiment of this disclosure, the bus communication protocol switch includes: at least one bus communication protocol switch module including six bus communication protocol switch blocks, each of the bus communication protocol switch blocks having sixteen bus communication protocol ports, a part of the bus communication protocol ports coupled to the graphics processing units respectively and another part of the bus communication protocol ports capable of expanding; and a bus communication protocol manage module coupled to the bus communication protocol switch blocks and managing mutual communications between the bus communication protocol ports of each of the bus communication protocol switch blocks.

According to one or more embodiment of this disclosure, eight of the bus communication protocol ports of each of the bus communication protocol switch blocks are coupled to eight of the graphics processing units, and remaining eight of the bus communication protocol ports of each of the bus communication protocol switch blocks are capable of expanding.

According to one or more embodiment of this disclosure, the graphics processing system further comprising: a peripheral component interconnect express (PCIE) switch group coupled to the central processing unit and the graphics processing units for expanding a high-speed serial computer expansion standard port of the central processing unit and implementing mutual communications between the graphics processing units and the central processing unit; a PCIE expansion module communicatively coupled to the PCIE switch group, the bus communication protocol manage module and the management board; wherein the management board manages the PCIE switch group and the bus communication protocol switch via the PCIE expansion module.

According to one or more embodiment of this disclosure, the PCIE expansion switch group includes: a first PCIE switch coupled to the central processing unit; a second PCIE switch coupled to the first PCIE switch, the second PCIE switch downlinking a part of the graphics processing units; a third PCIE switch coupled to the first PCIE switch, the third PCIE switch downlinking another part of the graphics processing units; the management board coupled to the first to third PCIE switches and managing the first to third PCIE switches.

According to one or more embodiment of this disclosure, the first PCIE switch includes: at least one first host port communicatively coupled to the central processing unit; at least two first optical fiber communication port communicatively coupled to the second and third PCIE switches respectively; and at least one first uplink port communicatively coupled to the management board.

According to one or more embodiment of this disclosure, the second PCIE switch includes: at least one second optical fiber communication port communicatively coupled to one of the first optical fiber communication ports of the first PCIE switch; at least one second uplink port communicatively coupled to the management board; and at least one second downlink port communicatively coupled to the graphics processing unit.

According to one or more embodiment of this disclosure, the third PCIE switch includes: at least one third optical fiber communication port communicatively coupled to another one of the first optical fiber communication ports of the first PCIE switch; at least one third uplink port communicatively coupled to the management board; and at least one third downlink port communicatively coupled to the graphics processing unit.

According to one or more embodiment of this disclosure, the second downlink port of the second PCIE switch or the third downlink port of the third PCIE switch is configured to couple with a network card or a solid state disk.

According to one or more embodiment of this disclosure, the first to third PCIE switches work in virtual modes; and the management board dynamically manages the first to third PCIE switches.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

It should be noted that the illustrations provided in the following embodiments merely illustrate the basic concept of the present invention in a schematic manner, and the drawings only show the components related to the present invention and do not show the actual number and actual shape of the components. The type, the actual number and the proportion of each component can change randomly, and its layout can be more complicated.

Figure 1:
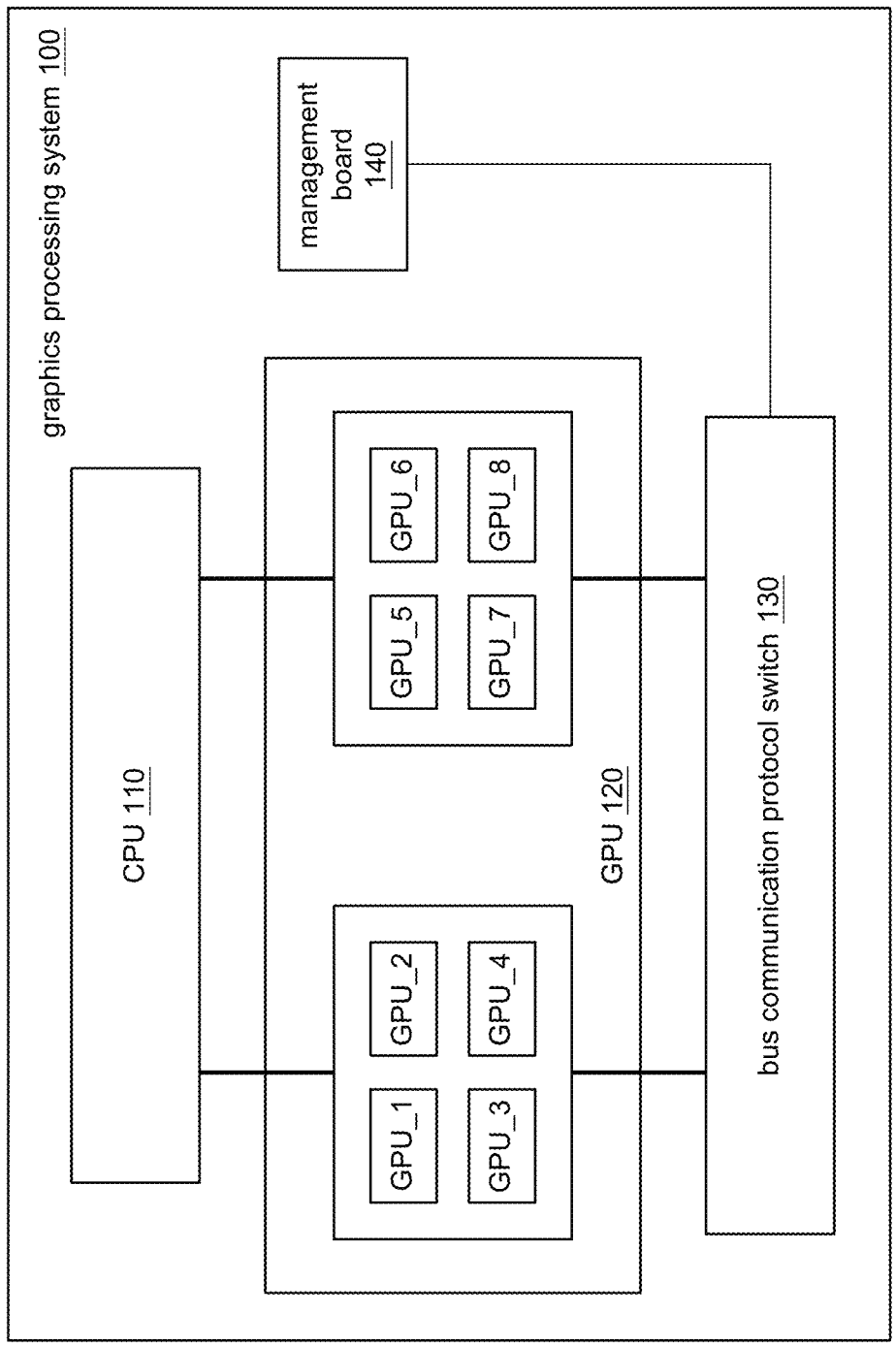
FIG. 1 is a schematic view of a graphics processing system according to an embodiment of the present disclosure.

In addition to the requirement of high-bandwidth performance between graphics processing units (GPUs) and a central processing unit (CPU), a multi-GPU system also requires a high bandwidth between GPUs which means a peer-to-peer (Peer-to-Peer) bandwidth. In order to increase the bandwidth of the multi-GPU system, the present disclosure provides a graphics processing system. Please refer to FIG. 1 which is a schematic view of a graphics processing system according to an embodiment of the present disclosure. The graphics processing system 100 comprises a central processing unit (CPU) 110, a plurality of graphics processing units 120, a bus communication protocol switch 130 and/or a management board 140. The graphics processing units 120 are communicatively coupled to the central processing unit 110. The bus communication protocol switch 130 is coupled to the graphics processing units 120 and implements mutual communications between the graphics processing units 120. The management board 140 is communicatively coupled to the bus communication protocol switch 130 and manages the bus communication protocol switch 130.

In the present invention, NVLink is a bus and its communication protocol developed and introduced by NVIDIA. NVLink uses a peer-to-peer architecture and serial transmissions to couple GPUs and to couple CPU with GPU. NVLink port is a peer-to-peer communication connecting port between GPU and GPU or between CPU and GPU. The bus communication protocol switch 130 is a NVLink switch.

Figure 2:
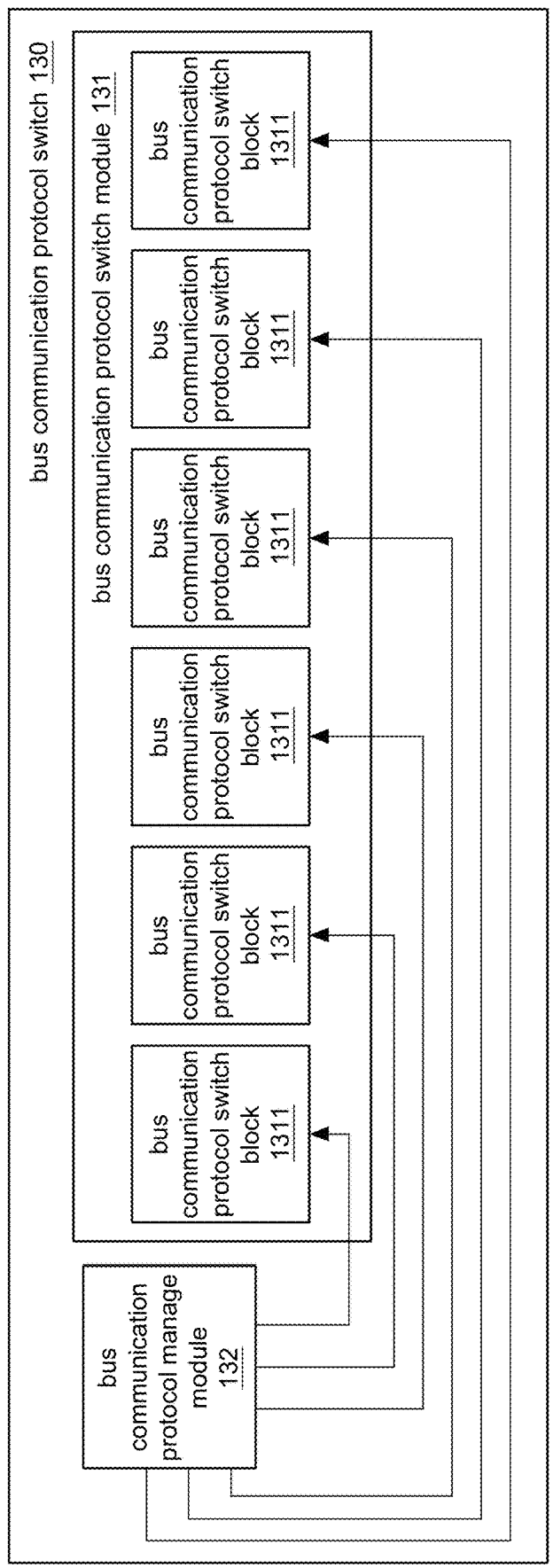
FIG. 2 is a schematic view of a bus communication protocol switch of a graphics processing system according to an embodiment of the present disclosure.

Please refer to FIG. 2, in one embodiment of the present disclosure, the bus communication protocol switch 130 includes at least one bus communication protocol switch module 131 and a bus communication protocol manage module 132. The bus communication protocol switch module 131 includes six bus communication protocol switch blocks 1311, each of the bus communication protocol switch blocks 1311 has sixteen bus communication protocol ports, a part of the bus communication protocol ports is coupled to the graphics processing units respectively and another part of the bus communication protocol ports is capable of expanding. The bus communication protocol manage module 132 is coupled to the bus communication protocol switch blocks 1311 and manages mutual communications between the bus communication protocol ports of each of the bus communication protocol switch blocks 1311.

Figure 3:
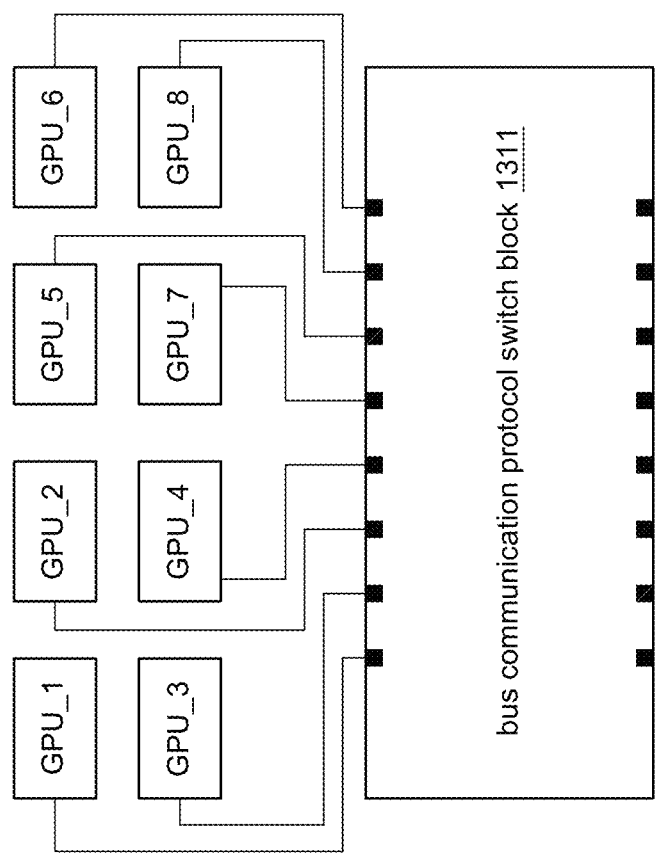
FIG. 3 is a schematic view of a communication structure of a bus communication protocol switch of a graphics processing system according to an embodiment of the present disclosure.

Please refer to FIG. 3, in one embodiment of the present disclosure, eight of the bus communication protocol ports of each of the bus communication protocol switch blocks 1311 are coupled to eight of the graphics processing units, and remaining eight of the bus communication protocol ports of each of the bus communication protocol switch blocks 1311 are capable of expanding.

Figure 4:
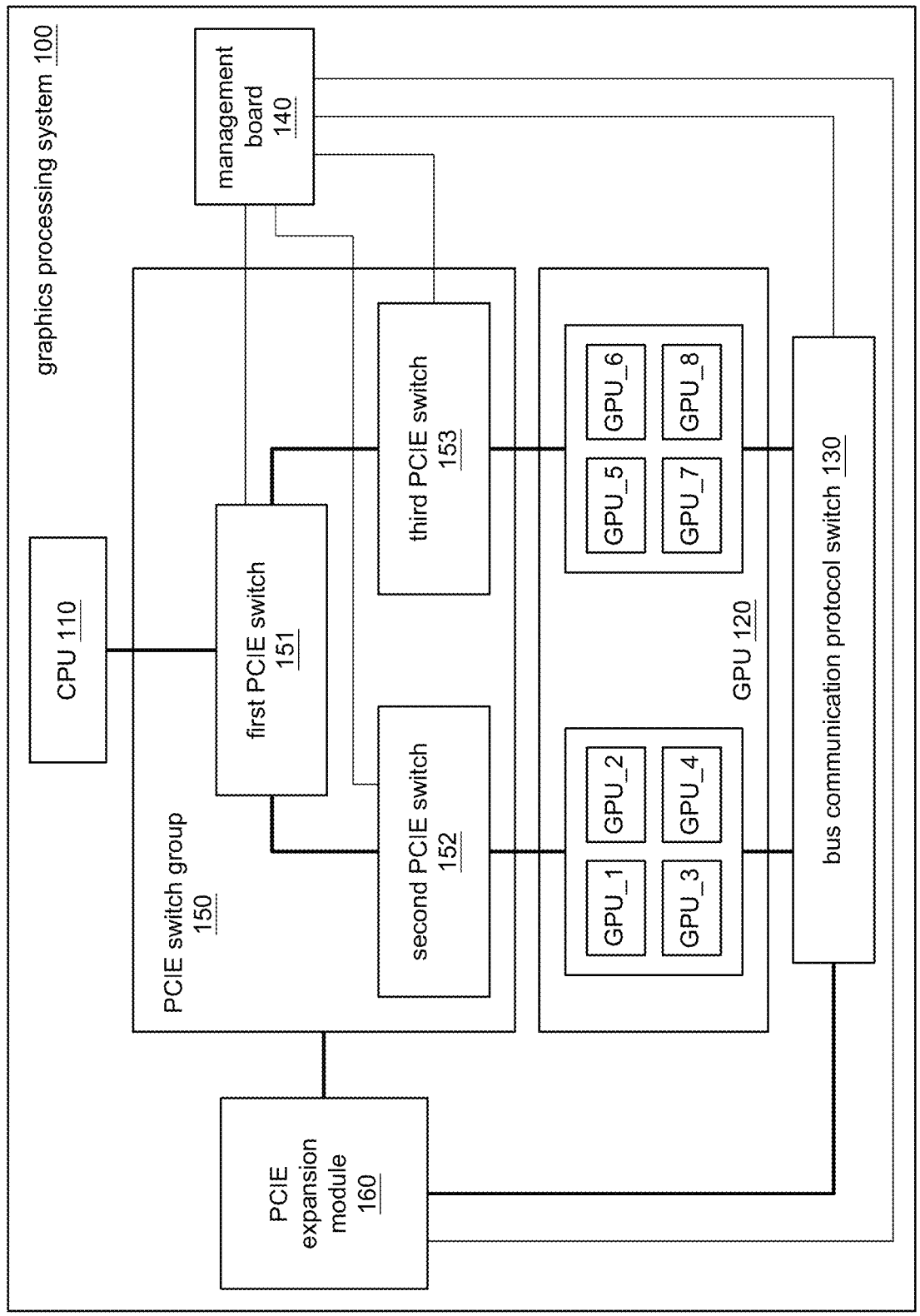
FIG. 4 is a schematic view of a graphics processing system according to another embodiment of the present disclosure.

Please refer to FIG. 4, in one embodiment of the present disclosure, the graphics processing system 100 further comprises a PCIE switch group 150 and/or a PCIE expansion module 160. The PCIE switch group 150 is coupled to the central processing unit 110 and the graphics processing units 120 for expanding a PCIE port of the central processing unit 110 and implementing mutual communications between the graphics processing units 120 and the central processing unit 110. The PCIE expansion module 160 is communicatively coupled to the PCIE switch group 150, the bus communication protocol manage module 132 and the management board 140. The management board 140 manages the PCIE switch group 150 and the bus communication protocol switch 130 via the PCIE expansion module 160.

Please refer to FIG. 4, in one embodiment of the present disclosure, the PCIE expansion switch group 150 includes a first PCIE switch 151, a second PCIE switch 152 and/or a third PCIE switch 153. The first PCIE switch 151 is coupled to the central processing unit 110. The second PCIE switch 152 is coupled to the first PCIE switch 151. The second PCIE switch 152 downlinks a part of the graphics processing units 120. The third PCIE switch 153 is coupled to the first PCIE switch 151 and downlinks another part of the graphics processing units 120. The management board 140 is coupled to the first to third PCIE switches 151, 152 and 153 and manages the first to third PCIE switches 151, 152 and 153.

Furthermore, the first to third PCIE switches 151, 152 and 153 work in virtual modes; and the management board 140 dynamically manages the first to third PCIE switches 151, 152 and 153.

Figure 5A:
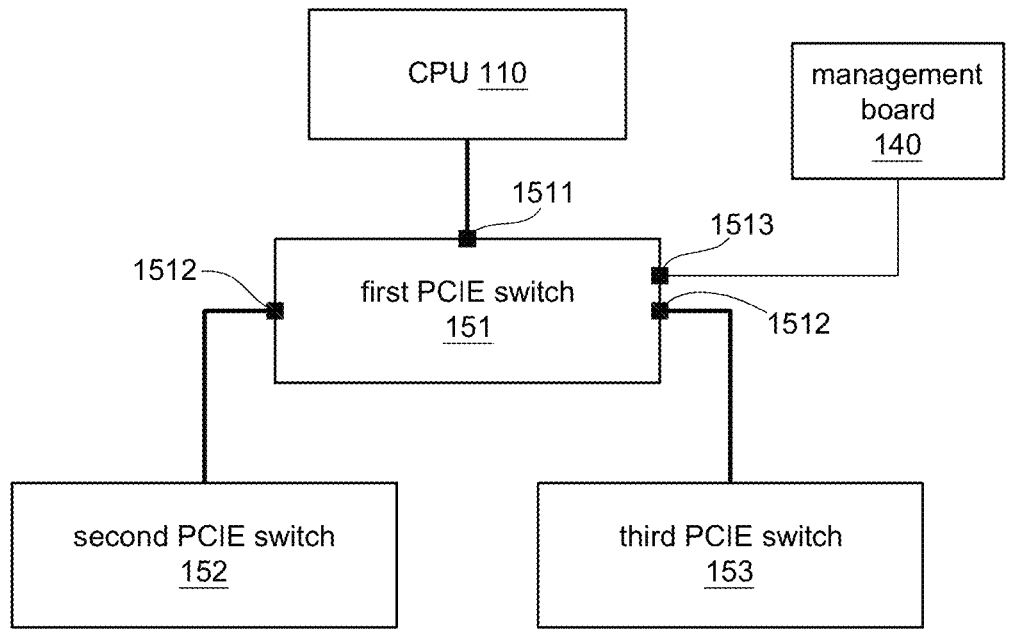
FIG. 5A is a schematic view of a first PCIE switch of a graphics processing system according to an embodiment of the present disclosure.

Please refer to FIG. 5A, in one embodiment of the present disclosure, the first PCIE switch 151 includes at least one first host port 1511, at least two first optical fiber communication port 1512 and at least one first uplink port 1513. The at least one first host port 1511 is communicatively coupled to the central processing unit 110. The at least two first optical fiber communication port 1512 are communicatively coupled to the second and third PCIE switches 152 and 153 respectively. The at least one first uplink port 1513 is communicatively coupled to the management board 140.

Figure 5B:
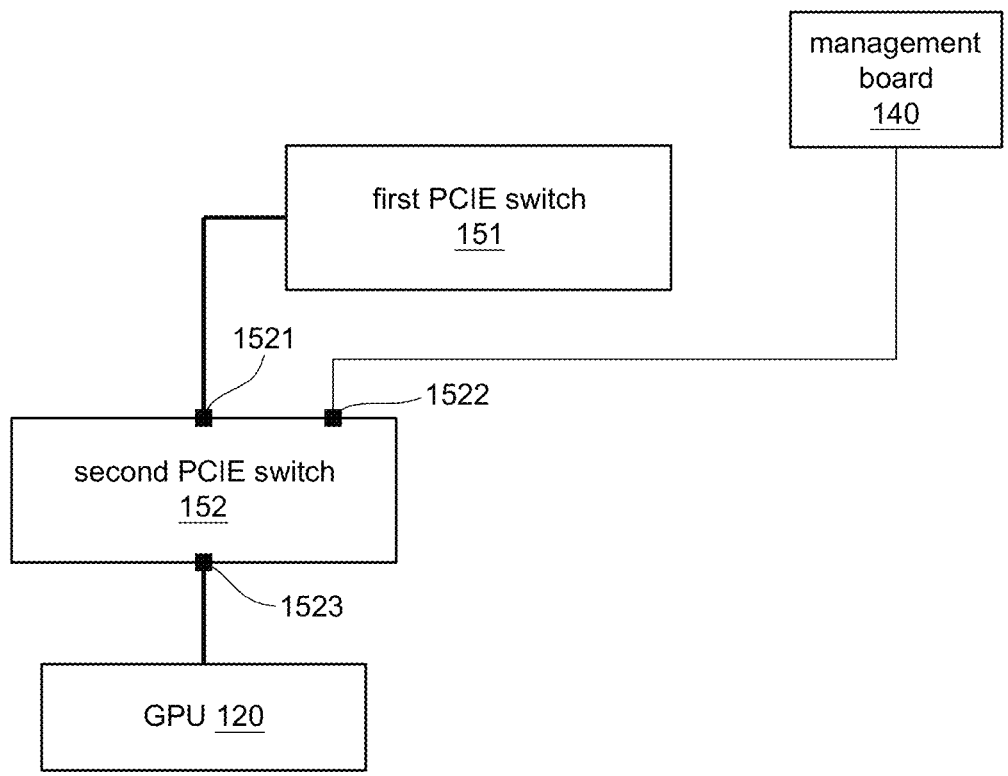
FIG. 5B is a schematic view of a second PCIE switch of a graphics processing system according to an embodiment of the present disclosure.

Please refer to FIG. 5B, in one embodiment of the present disclosure, the second PCIE switch 152 includes at least one second optical fiber communication port 1521, at least one second uplink port 1522 and at least one second downlink port 1523. The at least one second optical fiber communication port 1521 is communicatively coupled to one of the first optical fiber communication ports 1512 of the first PCIE switch 151. The at least one second uplink port 1522 is communicatively coupled to the management board 140. The at least one second downlink port 1523 is communicatively coupled to the graphics processing unit 120. The second downlink port 1523 of the second PCIE switch 152 is configured to couple with a network card or a solid state disk.

Figure 5C:
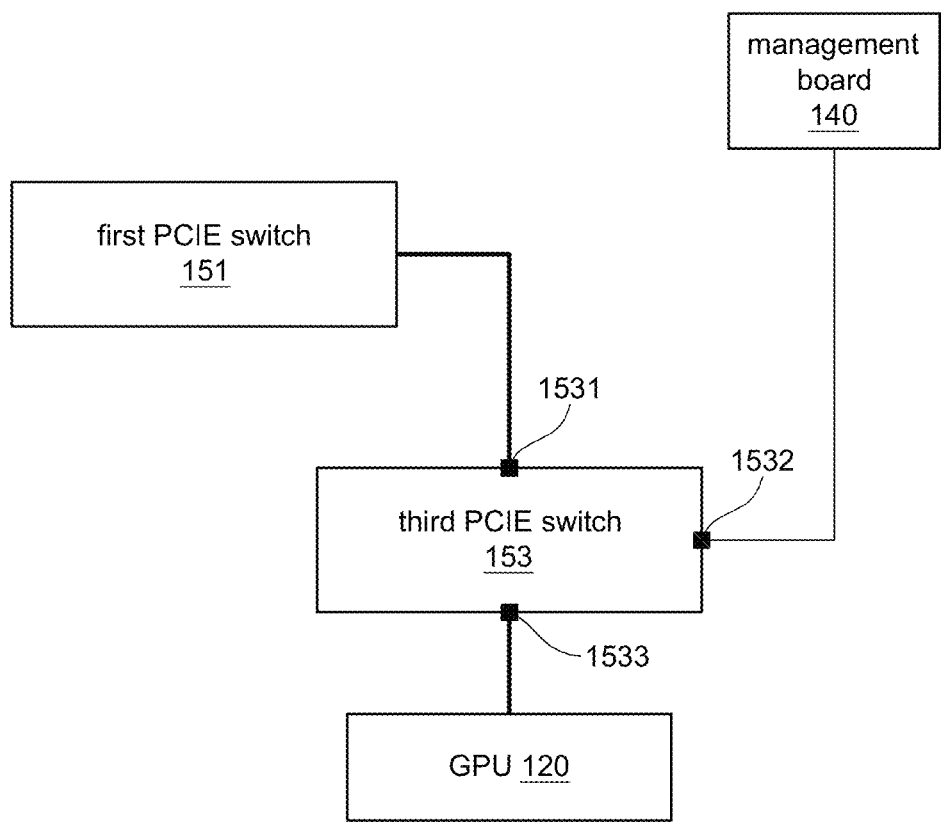
FIG. 5C is a schematic view of a third PCIE switch of a graphics processing system according to an embodiment of the present disclosure.

Please refer to FIG. 5C, in one embodiment of the present disclosure, the third PCIE switch 153 includes at least one third optical fiber communication port 1531, at least third uplink port 1532 and at least one third downlink port 1533. The at least one third optical fiber communication port 1531 is communicatively coupled to another one of the first optical fiber communication ports 1512 of the first PCIE switch 151. The at least third uplink port 1532 is communicatively coupled to the management board 140. The at least one third downlink port 1533 is communicatively coupled to the graphics processing unit 120. The third downlink port 1533 of the third PCIE switch 153 is configured to couple with a network card or a solid state disk.

As time progresses, requirements of customers for performances of GPU improve continuously. At the same time, the technologies of GPU vendors improve continuously, and we need to design an excellent architecture to fully utilize the high performance of GPU so that GPU is capable of processing customers' businesses.

Figure 6A:
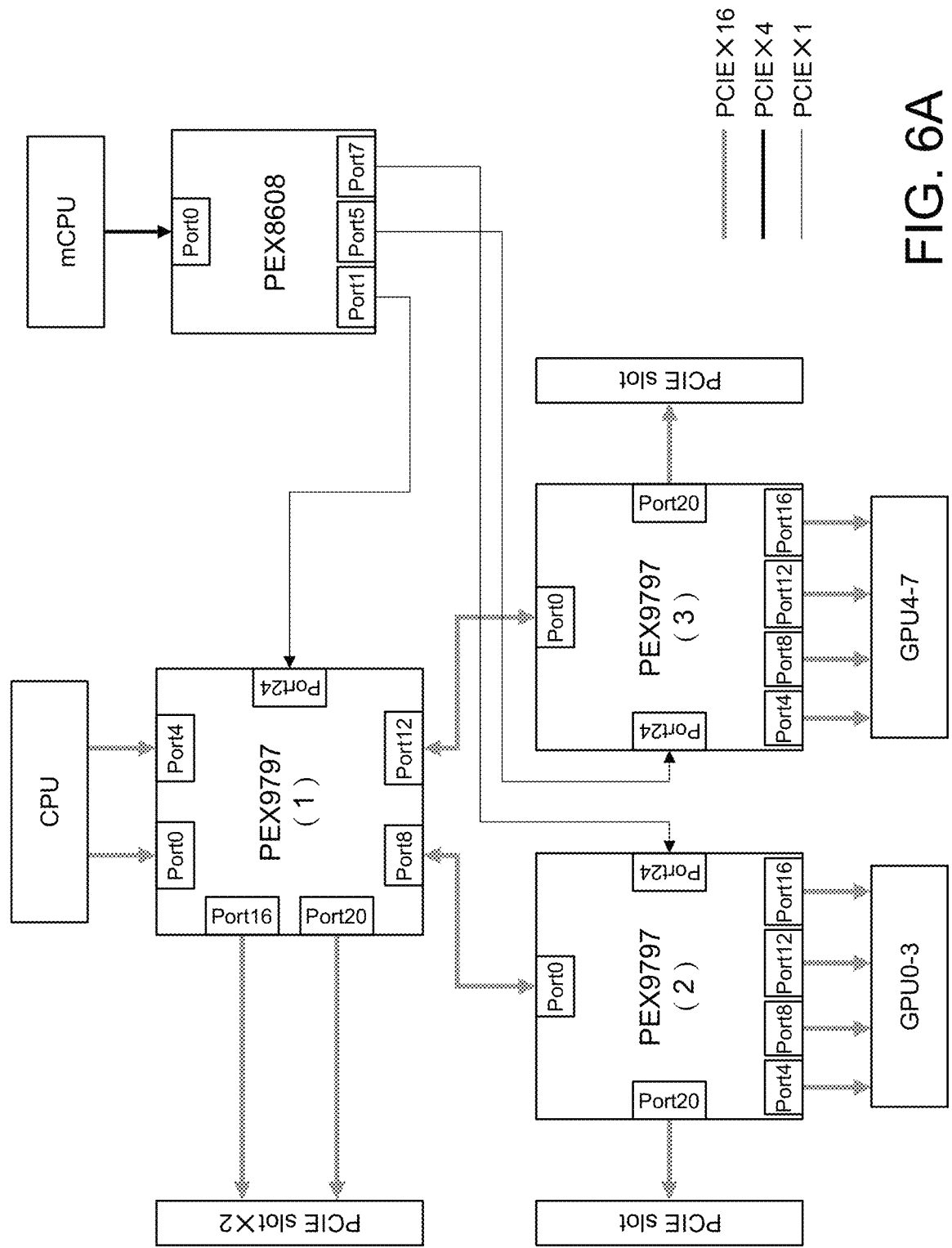
FIG. 6A and FIG. 6B are schematic views of specific implementation architectures of graphics processing systems according to an embodiment of the present disclosure.
Figure 6B:
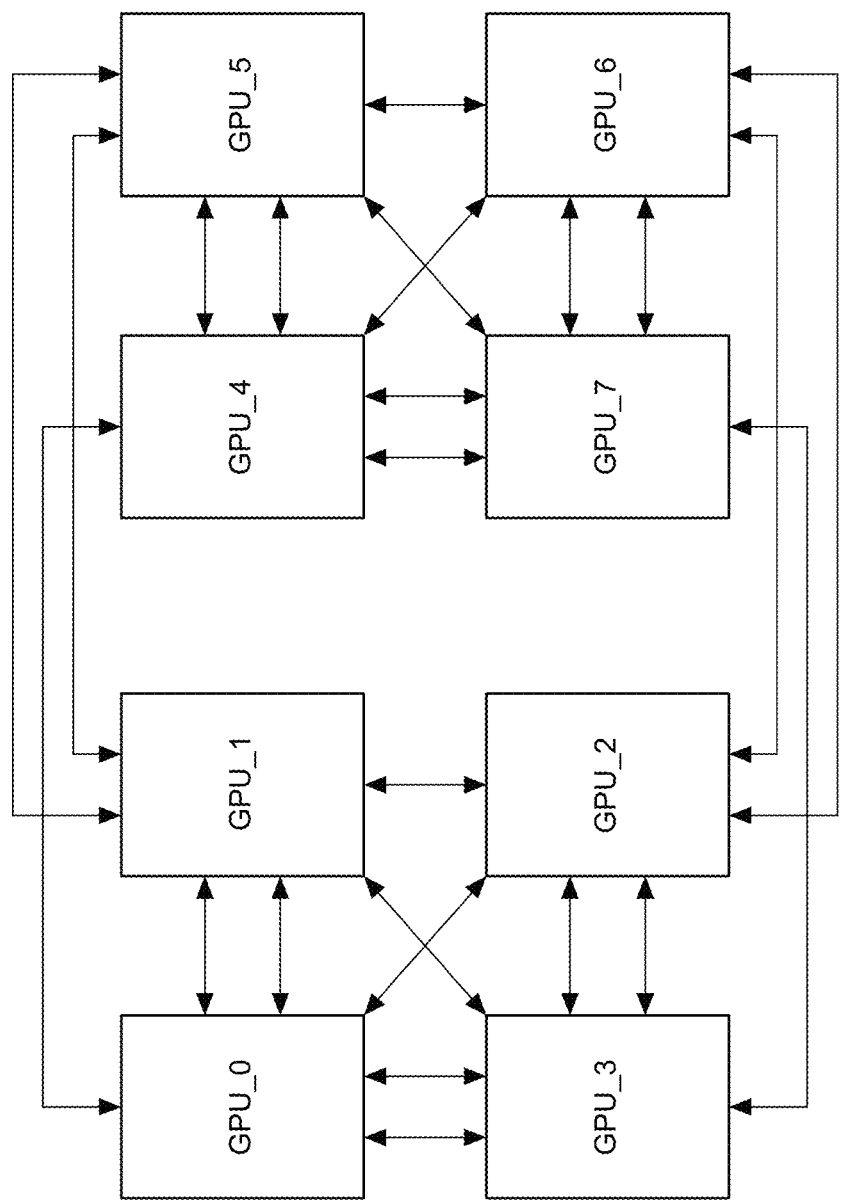

The original SXM2 GPU system has three switch to provide PCIE ports of CPU PCIE port to GPU. The primary switch uses a virtual mode to support dual X16 PCIE to the CPU and provide a sufficient bandwidth between CPU and GPU. A new generation SXM3 GPU system still can be used in the present invention. For mutual communications between GPUs, a part of mutual communications uses peer-to-peer communications provided by NVLink interconnection, and another part mutual communications utilizes the fiber optic communication mode of the PCIE switch as shown in FIGS. 6A and 6B. However, the peer-to-peer network communications of GPUs still uses PCIE protocol, the maximum speed of PCIE protocol is 8 Gbps, which is far lower than the speed of NVLink interconnection, wherein the speed of NVLink interconnection is 25 Gbps. Therefore, in the SXM3 GPU system, the NVLink switch can be used to implement communications between all GPUs by using the NVLink protocol, which can maximize the bandwidth of peer-to-peer network between GPUs, and the topology diagram of the SXM3 GPU system is shown in FIG. 7.

Figure 7:
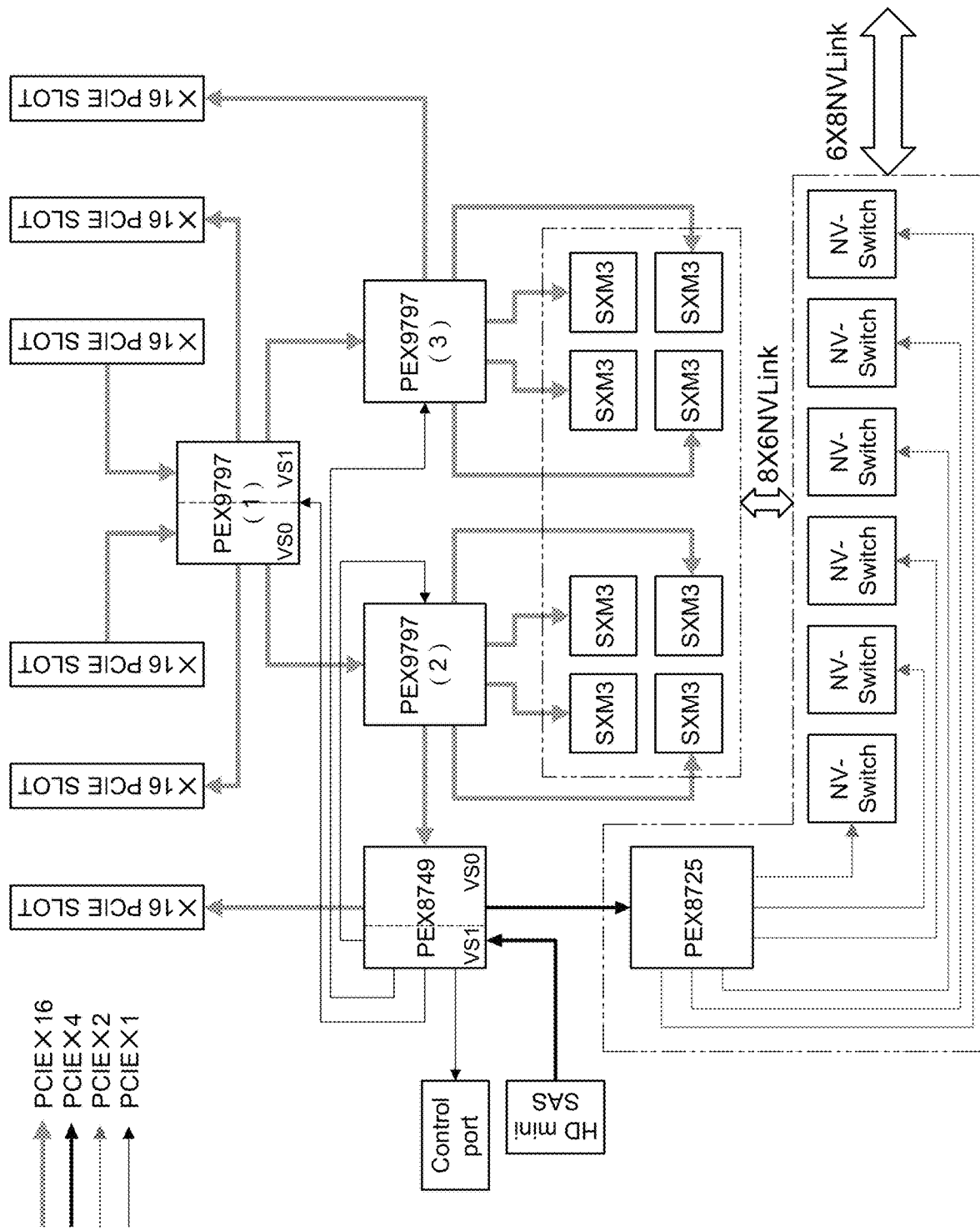
FIG. 7 is a schematic view of a specific implementation architecture of a graphics processing system according to another embodiment of the present disclosure.

Refer to FIG. 7, a topology diagram of the SXM3 GPU system is provided, the communication between CPU and GPU still adopts three PCIE switches (PEX9797). The first switch works in a virtual mode has two virtual bridges VS0 and VS1, the two virtual bridges VS0 and VS1 are connected CPU by two sets of X16 PCIE respectively, which can achieve communication bandwidths of 32 PCIE lanes between GPU and CPU. Because NVLink fiber communication requires a set of X4 PCIE for managing NV-Switch. The second switch is connected to a PEX8749 as an expansion of PCIE and PEX8749 also works in the virtual mode. The virtual bridge VS0 of PEX8749 is used for managing NVLink fiber communication and expanding a set of X16 PCIE configured to couple with a network card and a solid state disk (SSD). The virtual bridge VS1 of PEX8749 is used for managing PCIE switch fiber-optic communication, PEX8749 downlinks with three management ports of three PEX9797, which is used as X1 PCIE, and PEX8749 uplinks the management board via HD mini SAS, which is used as X4 PCIE, and a control port is reserved to expand the fiber communication of PCIE switch, which is used as X1 PCIE. The peer-to-peer network communication between two GPUs uses an NVLink fiber-optic communication structure. Each of SXM3 GPU has six sets of NVLink ports, each set of NVLink ports is connected to one NV-Switch (bus communication protocol switch module), which has forty-eight NV-Links; each NV-Switch has sixteen sets of NVLink ports. Eight of NVLink ports are interconnected with GPUs, and remaining eight NVLink ports are used to expand the fiber-optic communication of NVLink, which means the remaining eight NVLink ports are capable of connecting with additional eight GPUs to form a sixteen-GPUs system. When two GPUs need to communicate, such as GPU1 and GPU2, since each GPU has a set of NVLink port to interconnect with NV-Switch, the host can manage six NV-Switches by PEX8725, so that NV Links of GPU1 and GPU2 can communicate with each other. At the same time, there are six sets of NVLink to provide data transmissions between GPUs. Each set of NVLink can provide a bidirectional bandwidth of about 50 GB/s and a total bandwidth can be achieved 300 GB/s.

The topology of SXM3 GPU system is improved from SXM2 GPU system. In addition to the original advantages of SXM2 GPU system, SXM3 GPU system also has following advantages:

The optical fiber communication mode of PCIE switch of the present invention is mainly used for multiple switches, flexible communications between CPUs and GPUs can be realized by dynamic managements of the management ports for the switches.

The present invention can solve the problem that the bandwidth of the peer-to-peer network communication between GPUs is low, and can provide a high bandwidth between GPU and CPU.

The present invention can realize the direct exchange of data between different GPU systems in the same network without using CPU and CPU's memory after the secondary PCIE switch is connected to a network by a network card, which greatly improves data exchanging capability of GPU system.

Moreover, the present invention maximizes and equalizes the bandwidth of peer-to-peer network communication between GPUs, and the theoretical maximum bidirectional bandwidth can reach 300 GB/s, and also can be capable of connecting with additional eight GPUs to form a sixteen GPUs system, which can realize the peer-to-peer network communication between any two of GPU. At the present invention, the fiber-optic communication of PCIE switch (PCIE switch group 150) and the optical communication management link of NVLink switch are combined into one switch (PEX8749 in the figure, PCIE expansion module), which simplifies the structure of the board.

In view of the above description, the present invention effectively overcomes various shortcomings in the related art and has high industrial applicability.

What is claimed is:

1. A graphics processing system comprising:
   a central processing unit;
   a plurality of graphics processing units communicatively coupled to the central processing unit;
   a bus communication protocol switch coupled to the plurality of graphics processing units and implementing mutual communications between the graphics processing units; and
   a management board communicatively coupled to the bus communication protocol switch and managing the bus communication protocol switch, wherein the bus communication protocol switch includes:
   at least one bus communication protocol switch module including six bus communication protocol switch blocks, each of the bus communication protocol switch blocks having sixteen bus communication protocol ports, a part of the bus communication protocol ports coupled to the graphics processing units respectively and another part of the bus communication protocol ports being capable of expanding; and
   a bus communication protocol manage module coupled to the bus communication protocol switch blocks and managing mutual communications between the bus communication protocol ports of each of the bus communication protocol switch blocks;
   wherein each of the bus communication protocol ports is a peer-to peer communication connecting port between any two of the graphics processing units or between any one of the graphics processing units and the central processing unit;
   wherein the graphics processing system further comprises a peripheral component interconnect express (PCIE) switch group and a PCIE expansion module, the peripheral component interconnect express (PCIE) switch group is coupled to the central processing unit and the graphics processing units for expanding a PCIE port of the central processing unit and implementing mutual communications between the graphics processing units and the central processing unit, the PCIE expansion module is communicatively coupled to the PCIE switch group, the bus communication protocol manage module and the management board, the management board is connected to the PCIE switch group and the bus communication protocol switch, and the management board manages the PCIE switch group and the bus communication protocol switch via the PCIE expansion module.

2. The graphics processing system in claim 1, wherein eight of the bus communication protocol ports of each of the bus communication protocol switch blocks are coupled to eight of the graphics processing units, and remaining eight of the bus communication protocol ports of each of the bus communication protocol switch blocks are capable of expanding.

3. The graphics processing system in claim 1, wherein the PCIE expansion switch group includes:
   a first PCIE switch coupled to the central processing unit;
   a second PCIE switch coupled to the first peripheral component interconnect express switch, the second PCIE switch downlinking a part of the graphics processing units;
   a third PCIE switch coupled to the first PCIE switch, the third PCIE switch downlinking another part of the graphics processing units;
   the management board coupled to the first to third PCIE switches and managing the first to third PCIE switches.

4. The graphics processing system in claim 3, wherein the first PCIE switch includes:
   at least one first host port communicatively coupled to the central processing unit;
   at least two first optical fiber communication port communicatively coupled to the second and third PCIE switches respectively; and
   at least one first uplink port communicatively coupled to the management board.

5. The graphics processing system in claim 4, wherein the second PCIE switch includes:
   at least one second optical fiber communication port communicatively coupled to one of the first optical fiber communication ports of the first PCIE switch;
   at least one second uplink port communicatively coupled to the management board; and
   at least one second downlink port communicatively coupled to the graphics processing unit.

6. The graphics processing system in claim 5, wherein the third PCIE switch includes:
   at least one third optical fiber communication port communicatively coupled to another one of the first optical fiber communication ports of the first PCIE switch;
   at least one third uplink port communicatively coupled to the management board; and
   at least one third downlink port communicatively coupled to the graphics processing unit.

7. The graphics processing system in claim 6, wherein the second downlink port of the second PCIE switch or the third downlink port of the third PCIE switch is configured to couple with a network card or a solid state disk.

8. The graphics processing system in claim 3, wherein the first to third PCIE switches work in virtual modes; and the management board dynamically manages the first to third PCIE switches.

* * * * *